United States Patent Office.

FRANK A. HEADSON, OF MILWAUKEE, WISCONSIN, ASSIGNOR, BY MESNE ASSIGNMENTS, TO THE ASBESTOS BRAKE COMPANY, A CORPORATION OF NEW JERSEY.

BRAKE-BAND LINING.

997,498.  Specification of Letters Patent.  Patented July 11, 1911.

No Drawing.  Application filed September 14, 1909. Serial No. 517,705.

*To all whom it may concern:*

Be it known that I, FRANK A. HEADSON, a citizen of the United States of America, residing at Milwaukee, county of Milwaukee, State of Wisconsin, have invented certain new and useful Improvements in Brake-Band Linings, of which the following is a specification.

My invention relates to apparatus for checking the speed of revolution of rotating members of various mechanisms, as in wheeled vehicles, hoisting machinery and the like, and comprises an improved flexible brake band adapted to be used as a facing for the ordinary metal brake band, and to bear upon the drum or other revolving member when the brake is set. Heretofore such linings have been made of woven strips of various fibers of mineral, animal, or vegetable origin. In use these linings are liable to become saturated with water or other liquids which cause them to swell up and interfere with the adjustment of the brake apparatus and which also injuriously affect their strength and wearing qualities. I have discovered that if such brake linings, particularly when made of asbestos, are treated with a compound whose main constituent is iron, mixed with a suitable waterproofing solution, it greatly improves their efficiency and lasting qualities.

The preferred composition for carrying out my invention comprises pulverized ferric oxid, magnetic iron ore, the chemical formula of which is $Fe_3O_4$, and metallic alcoholized iron, with some rubber compound or other cementing material. This mixture, in a powdered state is forced into the fabric, out of which the brake band linings are made, by spreading same on the fabric and running it through pressure rolls. It is driven into the fabric by this pressure and partly solidifies on the surface thereof, forming a soft, flexible metallic facing for the fabric which is waterproof, little affected by heat or cold, will not vaporize under the heat generated by heavy brake applications, and coöperates most satisfactorily with the brake drums of iron or other metals against which it is pressed in use. The cementing substance should be of a waterproof character. The most beneficial results are attained when woven asbestos bands are treated with the above specified composition, as a brake lining is then produced which is substantially composed of mineral substances.

The alcoholized iron used is composed of finely powdered metallic iron cleansed by passing alcohol through it.

Having described my invention, what I claim is:

1. A brake band lining composed of woven asbestos impregnated and faced with finely divided iron.

2. A brake lining composed of a woven textile fabric faced and impregnated with a pulverized mixture of ferric oxid, magnetic iron and metallic alcoholized iron, and a cementing substance.

3. A brake lining composed of a woven textile fabric faced and impregnated with a pulverized mixture of ferric oxid, magnetic iron and metallic alcoholized iron, and a rubber compound.

4. A brake band lining composed of woven asbestos impregnated and faced with a pulverized mixture of ferric oxid, magnetic iron, and metallic alcoholized iron.

5. A brake band lining composed of woven asbestos impregnated and faced with a pulverized mixture of ferric oxid, magnetic iron, and metallic alcoholized iron, together with a cementing substance.

6. A brake band lining composed of woven asbestos impregnated and faced with a pulverized mixture of ferric oxid, magnetic iron, and metallic alcoholized iron, together with a rubber compound.

FRANK A. HEADSON.

Witnesses:
P. HUHN,
LOUIS ROASCH.